(12) United States Patent
Saeki

(10) Patent No.: US 6,298,104 B1
(45) Date of Patent: Oct. 2, 2001

(54) CLOCK RECOVERY CIRCUIT

(75) Inventor: Takanori Saeki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/131,442

(22) Filed: Aug. 10, 1998

(30) Foreign Application Priority Data

Aug. 12, 1997 (JP) .................................................. 9-217782

(51) Int. Cl.⁷ ...................................................... H04L 7/06
(52) U.S. Cl. .................... 375/364; 375/371; 375/373; 375/374; 375/375; 375/376
(58) Field of Search ................... 375/364, 371, 375/373, 375, 376, 326, 327; 370/516, 517; 713/400, 401, 500, 503; 327/149, 152, 153, 158, 161

(56) References Cited

U.S. PATENT DOCUMENTS

| | | | | |
|---|---|---|---|---|
| 5,127,026 | * | 6/1992 | Kelly et al. ........................... | 375/106 |
| 5,455,540 | * | 10/1995 | Williams ............................... | 331/1 A |
| 5,566,204 | * | 10/1996 | Kardontchik et al. ................ | 375/219 |
| 5,579,352 | * | 11/1996 | Liewellyn ............................. | 375/376 |
| 5,696,800 | * | 12/1997 | Berger ................................... | 375/361 |
| 5,878,097 | * | 3/1999 | Hase et al. ............................ | 375/371 |

FOREIGN PATENT DOCUMENTS

| | | |
|---|---|---|
| 8-204524 | 8/1996 | (JP) . |
| 8-330949 | 12/1996 | (JP) . |

OTHER PUBLICATIONS

M. Banu and A. E. Dunlop; Electronics Letter Nov. 5, 1992 vol. No.: 23 pp. 2127–2129.

Makoto Nakamura, Noboru Ishihara, and Yukio Akazawa 1996 Symposium on VLSI Circuits Digest of Technical Papers pp. 122–123.

* cited by examiner

*Primary Examiner*—Stephen Chin
*Assistant Examiner*—Mohammad Ghayour

(57) ABSTRACT

A clock recovery circuit enables a time for obtaining synchronized state of one pair of gate voltage-controlled oscillator to be shortened in a phase locked loop (PLL). In the clock recovery circuit, data is inputted to a pulse-duration generating circuit, before generating pulse width less than ¼ minimum data cycle from H of pulse, L of pulse, or both edges of H and L, thus the pulse is outputted both to a latched-circuit and a synchronous delay circuit. The synchronous delay circuit causes a delay time in proportion to data cycle to be generated at both edges of pulse or edge of two pulses, thus the delay time is maintained. An output pulse from a delay circuit is outputted both to a delay circuit and a latched-circuit by way of clock from the pulse synthesis circuit. The latched-circuit causes the data as an input to be latched by the clock from the pulse synthesis circuit, thus outputting regenerative data in company with the clock.

5 Claims, 8 Drawing Sheets

CLOCK RECOVERY CIRCUIT

BACKGROUND OF THE INVENTION

The present invention relates to a clock recovery circuit. More particularly this invention relates to a clock recovery circuit which enables synchronous period of data and clock to be shortened.

DESCRIPTION OF THE RELATED ART

FIG. 1 is a circuit diagram showing a conventional example of a clock recovery circuit for implementing burst transmission. As disclosed by "ELECTRONICS LETTER Nov. 5, 1992 Vol. 28 No. 23 pp. 2127–2129", the clock recovery circuit of FIG. 1 has a basic configuration which comprises a phase-locked loop (PLL) including a pair of a loop filter LF and a charge pump CP, a phase detector PD, a multiplexer MUX, a delay circuit Delay, a latched-circuit D-F/F, three sets of gate input voltage-controlled oscillator GVCO.

In the clock recovery circuit as shown in FIG. 1, the ordinary PLL consists of the loop filter LF, the charge pump CP, the phase detector PD, and the set of gate input voltage-controlled oscillator GVCO. The clock recovery circuit of FIG. 1 causes the signal to be synchronized with the reference clock 304 by way of input, the signal from the loop filter, at this time, is inputted to remaining two sets of the gate input voltage-controlled oscillator GVCO, thus synchronized state is always maintained to the reference clock 304. Further as shown in FIG. 2, the clocks A, and B which transmit in answer to either leading edge or trailing edge of the data 301 respectively are multiplexed by the multiplexer MUX to generate the clock 303. The latched-circuit D-F/F which causes data 301 through the delay circuit Delay to be latched, generates regenerative data 302.

Further, there is the method disclosed in "1996 Symposium on VLSI Circuits Digest of Technical Papers pp. 122–123", which method utilizes the data 301 in stead of the reference clock 304 similar to the conventional method described above.

However, in the conventional circuit, it is necessary to maintain one set of gate voltage-controlled oscillator GVCO of the synchronized state in the phase locked-loop (PLL), thus it should be waited for the time period for expending more than scores of clocks until the synchronized state is obtained.

SUMMARY OF THE INVENTION

In view of the foregoing, it is an object of the present invention to provide a clock recovery circuit which enables the necessary time for reaching synchronized state to be shortened.

In one arrangement to be described below by way of example in illustration of the invention, a clock recovery circuit includes a synchronous delay circuit which sets a delay time equivalent to a minimum data pitch of an input data, the minimum data pitch of input data being the time necessary to propagate the smallest element of input data, and which maintains the delay time, a pulse synthesis circuit which generates a clock from a data edge with a pulse from the synchronous delay circuit as an input, and a latched-circuit which latches data by using the clock from the pulse synthesis circuit, thus generating regenerative data.

In one particular arrangement to be described in illustration of the present invention, by way of example, there is provided a synchronous delay circuit which sets a delay time equivalent to a minimum data pitch of data from both edges of the input data.

In one yet particular arrangement to be described in illustration of the present invention, by way of example, there is provided a synchronous delay circuit which sets a delay time equivalent to a minimum data pitch of data from two successive input data.

In another particular arrangement to be described in illustration of the present invention, by way of example, there is provided a delay time set by the synchronous delay circuit which delay time is equivalent to width of 1-bit of the data.

In another arrangement to be described below in illustration of the present invention there is provided a data processing method of a clock recovery circuit which consists of a synchronous delay circuit, a pulse synthesis circuit, and a latched-circuit comprises the steps of setting a delay time equivalent to a minimum data pitch of an input data, and maintaining the delay time, generating a clock from a data edge with a pulse from the synchronous delay circuit as an input, and latching data by using the clock from the pulse synthesis circuit, thus generating regenerative data.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

A preferred embodiment of the present invention will now be described in detail referring to the accompanying drawings.

Configuration of Embodiment

Figure 1:
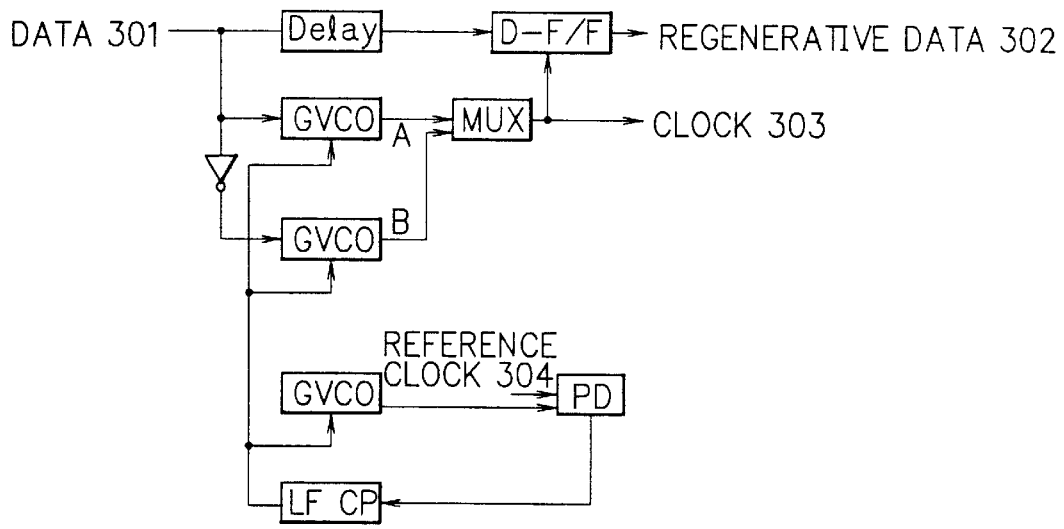
FIG. 1 is a circuit diagram showing a conventional example.
Figure 2:
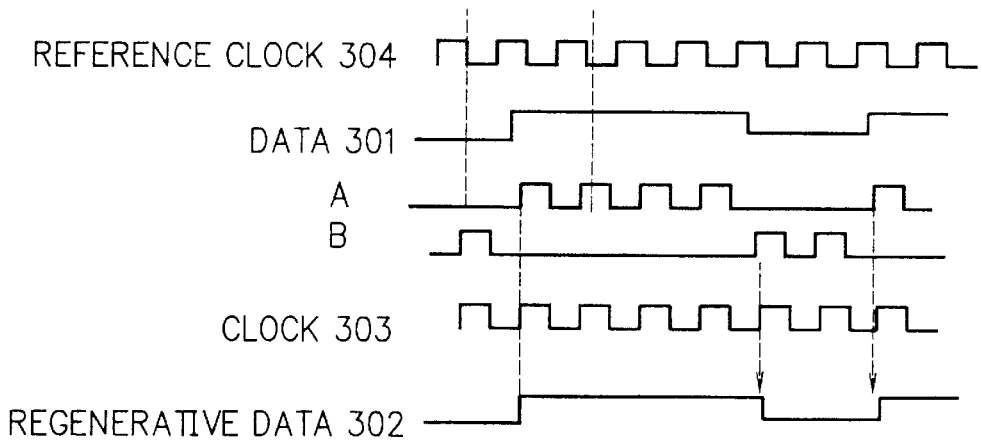
FIG. 2 is a timing chart showing operation of the conventional example.
Figure 3:
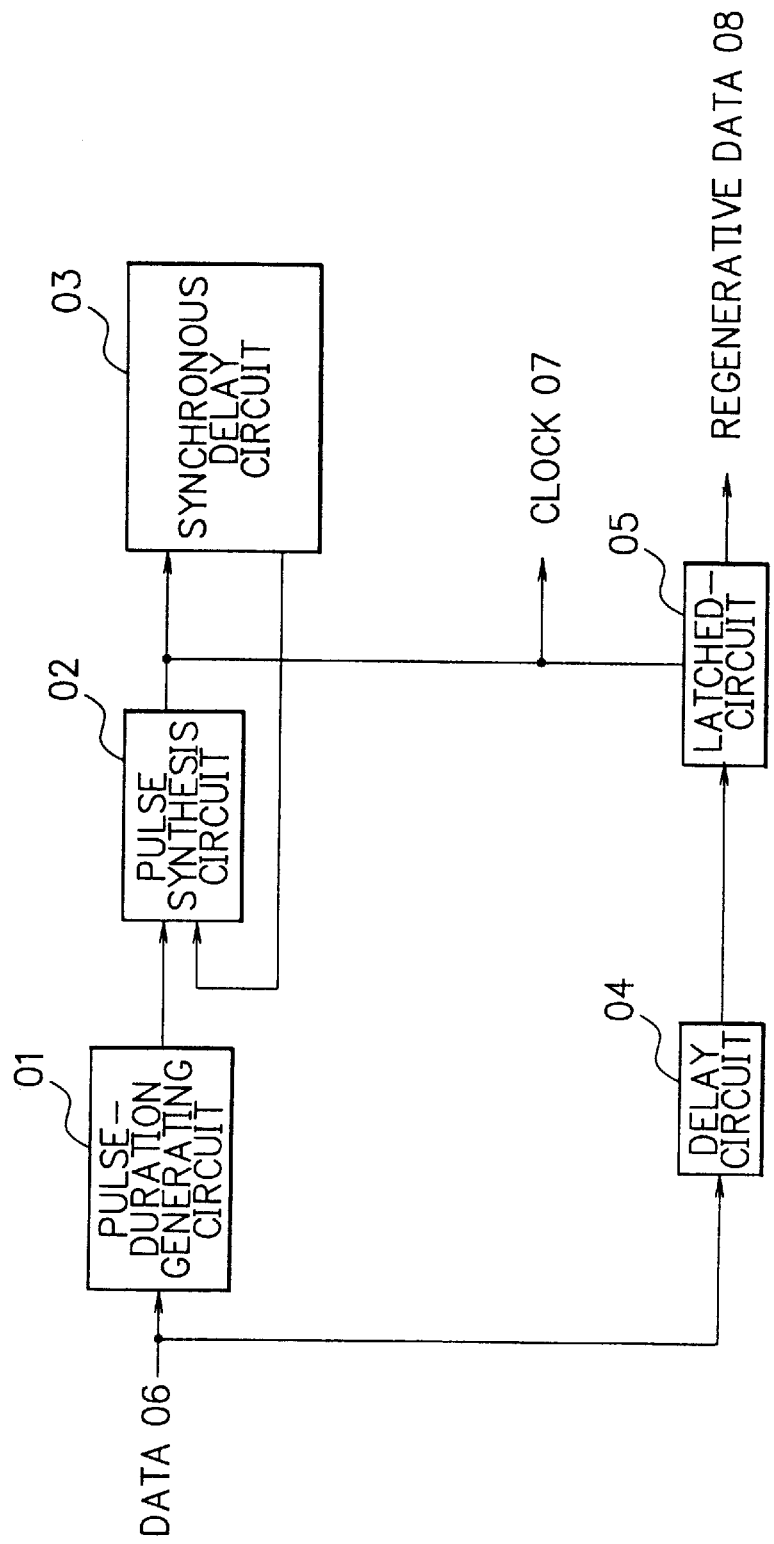
FIG. 3 is a circuit diagram showing a configuration of an embodiment of the present invention.

FIG. 3 is a circuit diagram showing a clock recovery circuit according to the configuration of embodiment of the present invention. The clock recovery circuit comprises a pulse-duration generating circuit 01, a pulse synthesis circuit 02, a synchronous delay circuit 03, delay circuit 04, and a latched-circuit 05.

In FIG. 3, when data 06 is inputted to the pulse-duration generating circuit 01, the pulse-duration generating circuit 01 generates a pulse-duration which is less than ¼ minimum data cycle from H of the pulse, or L of the pulse, or both edges of H, L, to output the pulse-duration to the latched-circuit 05 and the synchronous delay circuit 03 by way of a clock 07 through the pulse synthesis circuit 02.

The synchronous delay circuit 03 generates delay time in proportion to the data cycle at the both edges of the pulse or edge of the pulses which are two continuous pulses, if once the delay circuit is formed, thus causing the delay time to be maintained, so that the synchronous delay circuit 03 causes a feedback to the pulse synthesis circuit of output pulse from the delay circuit to be performed, thus outputting it by way of the clock 07 through the pulse synthesis circuit 05.

In the latched-circuit 05, the data 06 is inputted through the delay circuit 04, thus being latched by the clock 07 from the pulse synthesis circuit 02 so that the data 06 in conjunction with the clock 07 are outputted to the next stage by way of a regenerative data 08.

First Embodiment

Figure 4:
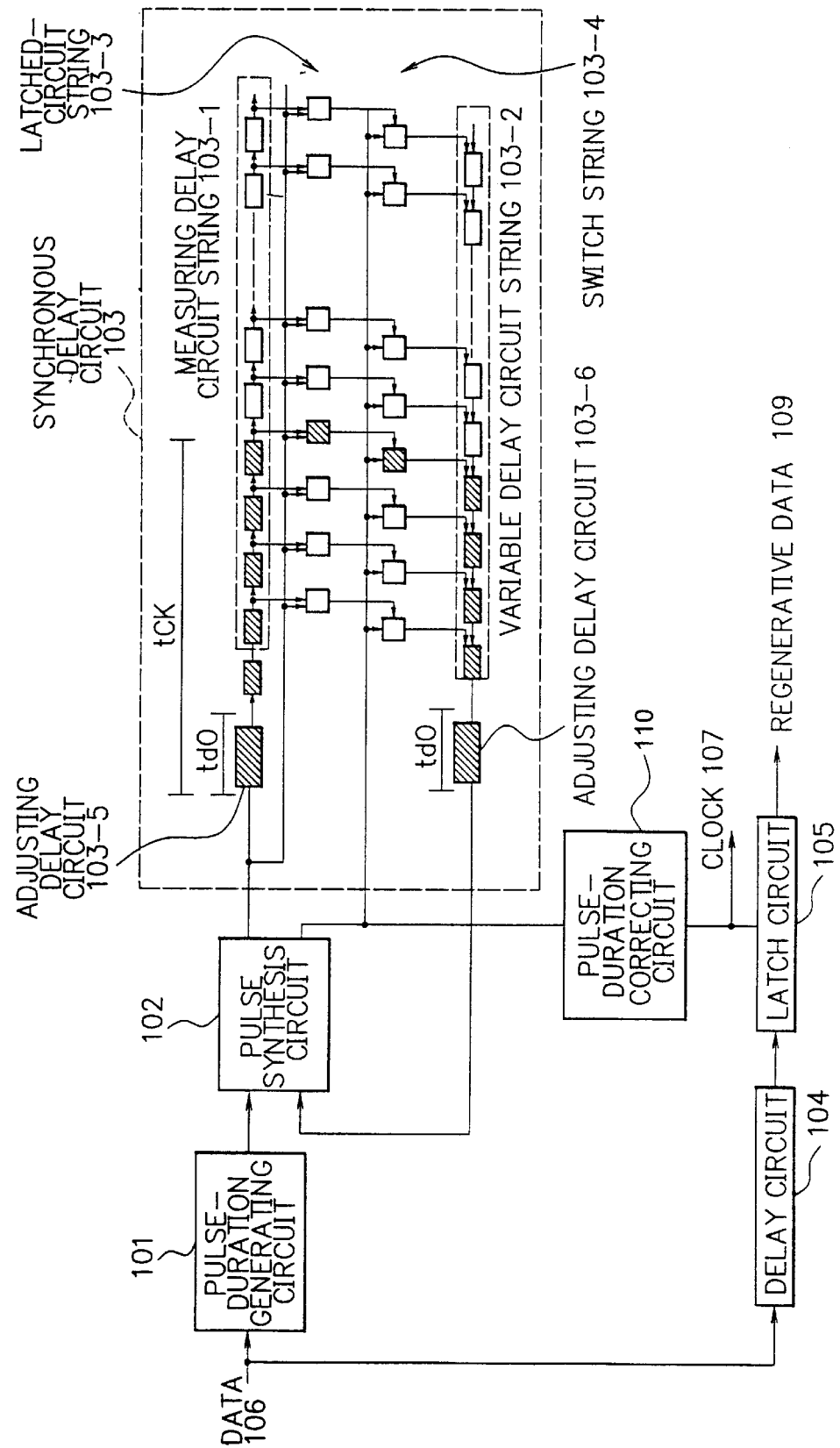
FIG. 4 is a circuit diagram showing a first embodiment of the present invention.

Next, an example which configuration embodiment of the invention is materialized will be described referring to the drawing by way of embodiment. FIG. 4 is a circuit diagram showing the first embodiment of the present invention.

The clock recovery circuit of the first embodiment shown in FIG. 4 has a pulse-duration generating circuit 101, a pulse synthesis circuit 102, synchronous delay circuit 103, a delay circuit 104, a latch circuit 105, and a pulse-duration correcting circuit 110. The clock recovery circuit generates a clock 107 and a regenerative data 109 with the data 106 as the input.

The synchronous delay circuit 103 comprises a measuring delay circuit string 103-1, a variable delay circuit string 103-2, a latched-circuit string 103-3, switch string 103-4, and adjusting delay circuits 103-5, 103-6.

Figure 5:
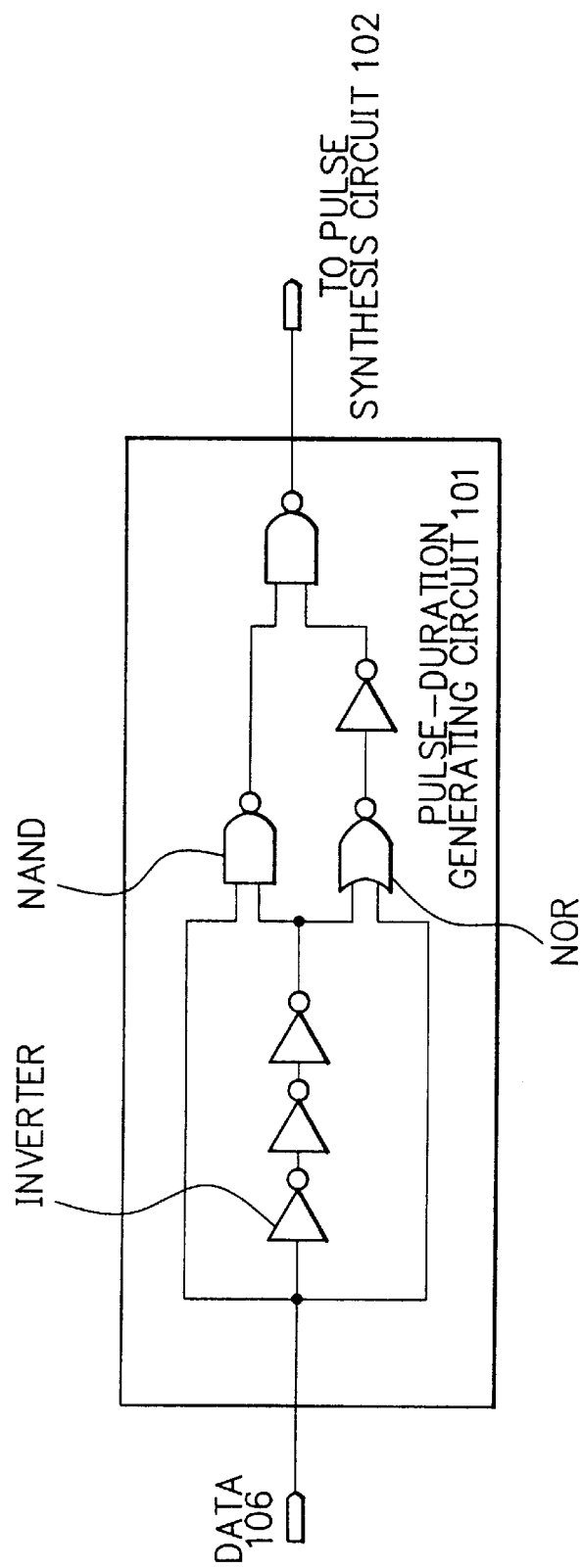
FIG. 5 is a circuit diagram showing a pulse-duration generation circuit according to the first embodiment of the present invention.

As shown in FIG. 5, the pulse-duration generating circuit 101 comprises an inverter, and logic circuits of NAND, NOR, thus generating a clock signal with fixed pulse duration from the both of leading edge and trailing edge of the pulse.

Figure 6:
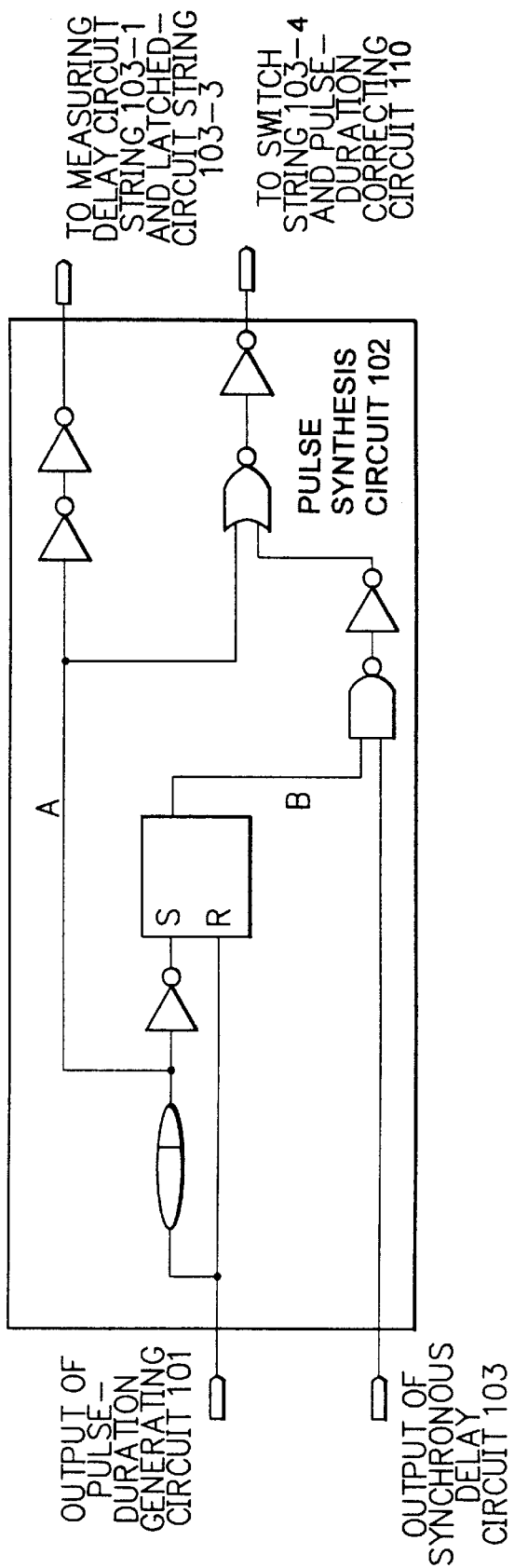
FIG. 6 is a circuit diagram showing a pulse synthesis circuit according to the first embodiment of the present invention.
Figure 7:
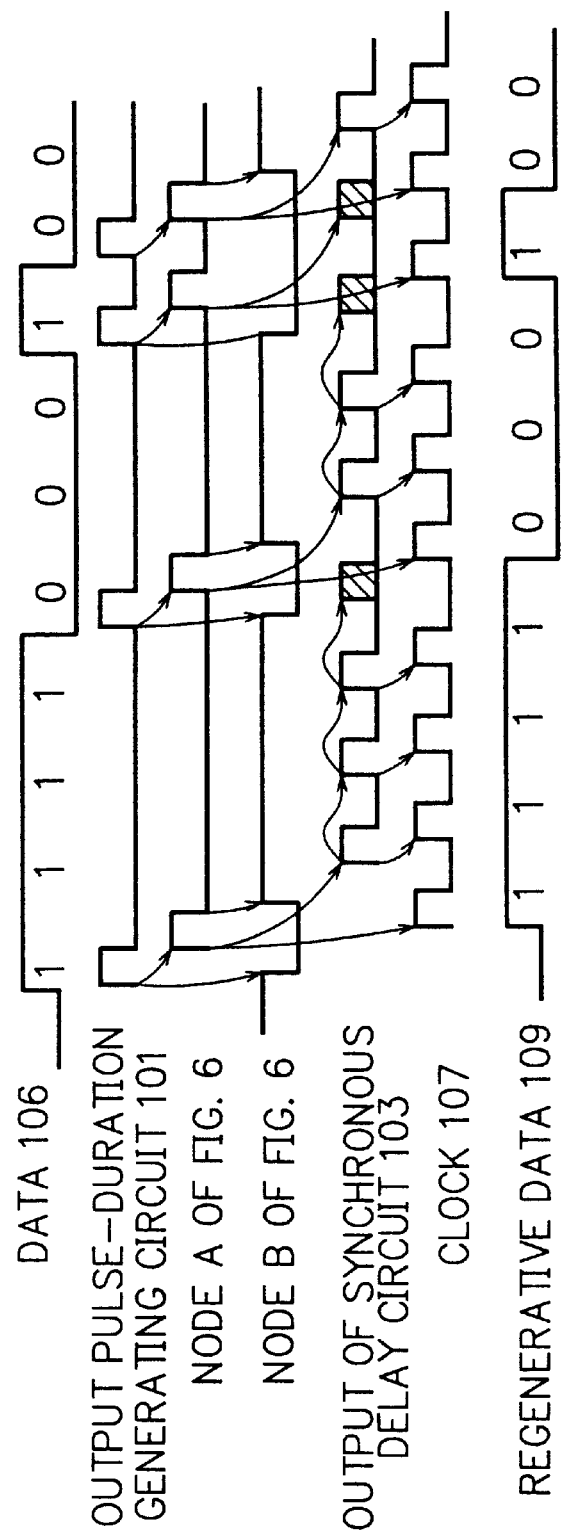
FIG. 7 is a timing chart showing operation of the present invention.

As shown in FIG. 6, the pulse synthesis circuit 102 includes an inverter, logic circuits of NAND, NOR, and a flip-flop circuit. As shown in FIG. 7, the pulse synthesis circuit 102 prefers the pulse from the pulse-duration generating circuit 101, thus outputting the signal to the switch string 103-4 of the synchronous delay circuit and to the pulse-duration correcting circuit 110. Further, the pulse synthesis circuit 102 outputs the clock pulse inputted from the pulse-duration generating circuit 101 both to the measuring delay circuit string 103-1 and the latched-circuit string 103-3.

Figure 8:
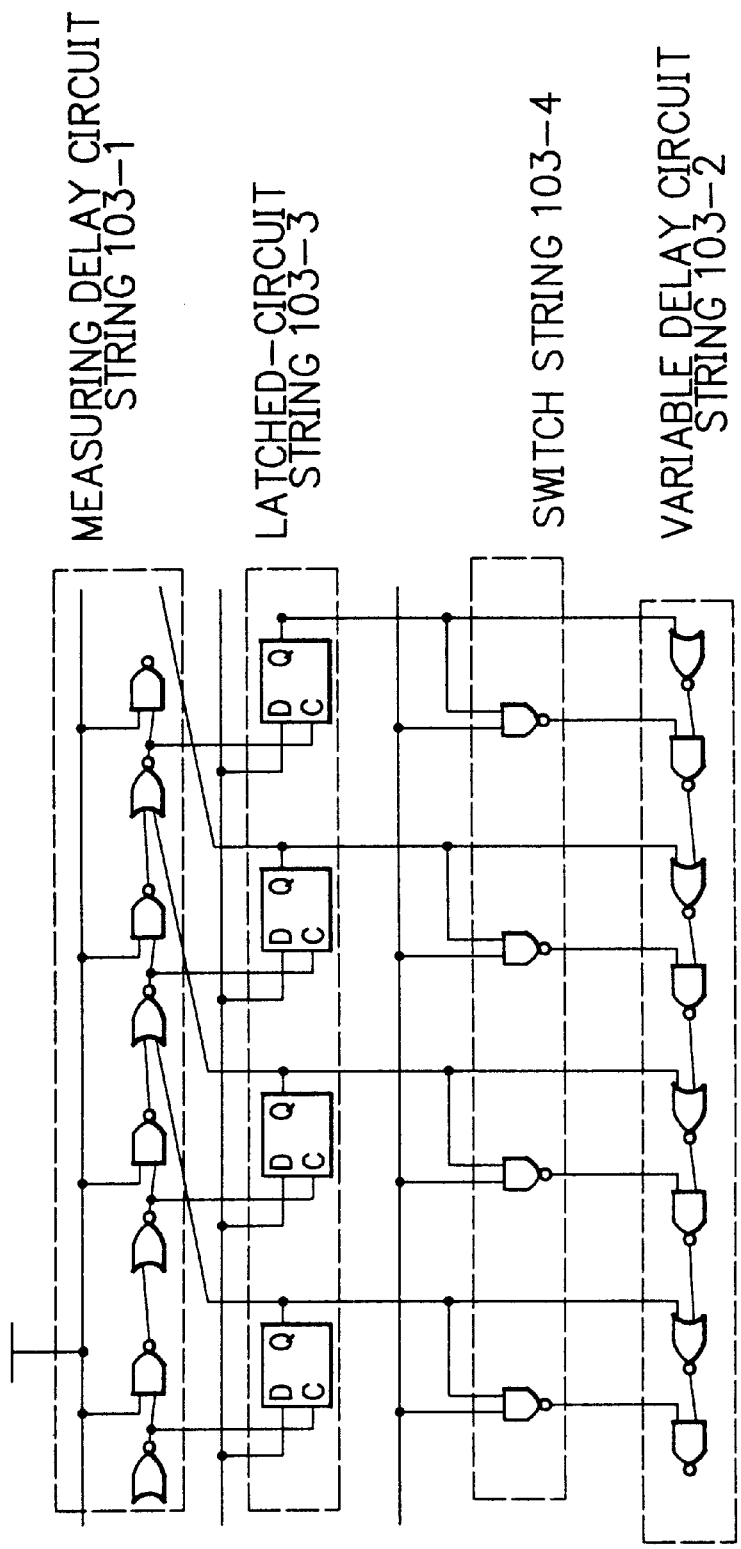
FIG. 8 is a circuit diagram showing a synchronous delay circuit according to the first embodiment of the present invention.

As there is shown respective circuit units in FIG. 8. The synchronous delay circuit 103 has the measuring delay circuit string 103-1, the variable delay circuit string 103-2, the latched-circuit string 103-3, the switch string 103-4, and the adjusting delay circuits 103-5, 103-6.

The pulse which is inputted to the synchronous delay circuit 103 from the pulse-duration generating circuit 101 through the pulse synthesis circuit 102 is inputted to the measuring delay circuit string 103-1 through the adjusting delay circuit string 103-5, thus causing the pulse to be advanced within the measuring delay circuit string 103-1. When the next pulse is inputted to the latched-circuit string 103-3, the output of the latched-circuit string 103-3 corresponding to the position of the pulse which is advancing the measuring delay circuit string 103-1 is set to be H.

The output of the latched-circuit string 103-3 is not reset during operation, if once the output becomes H. The H-output of the latched-circuit string brings the switch string 103-4 into conductive state, further stopping the next stage of the measuring delay circuit string 103-1, so as not to advance the clock pulse to the next position, and stopping the front stage of the variable delay circuit string 103-2, thus stopping the clock pulse from the front thereof.

Due to these operations, the delay time of the variable delay circuit string 103-2 comes into the minimum pitch of the pulse which is inputted to the synchronous delay circuit 103 from the pulse-duration generating circuit 101 through the pulse synthesis circuit 102. Namely, the delay time of the variable circuit string 103-2 becomes equal to the width of one bit of the inputted data 106.

Thus, the pulse is inputted to the variable delay circuit string 103-2 whose delay time is determined from the pulse synthesis circuit 102 through the switch string 103-4, thus the feedback of pulse with the width of 1-bit of the data 106 to the pulse-duration generating circuit 101 is performed. The variable delay circuit string generates clock successively even if the data is held under H-state or under L-state, and causing latch of the data to be performed by the latched-circuit to regenerate the regenerative data 109.

Second Embodiment

Figure 9:
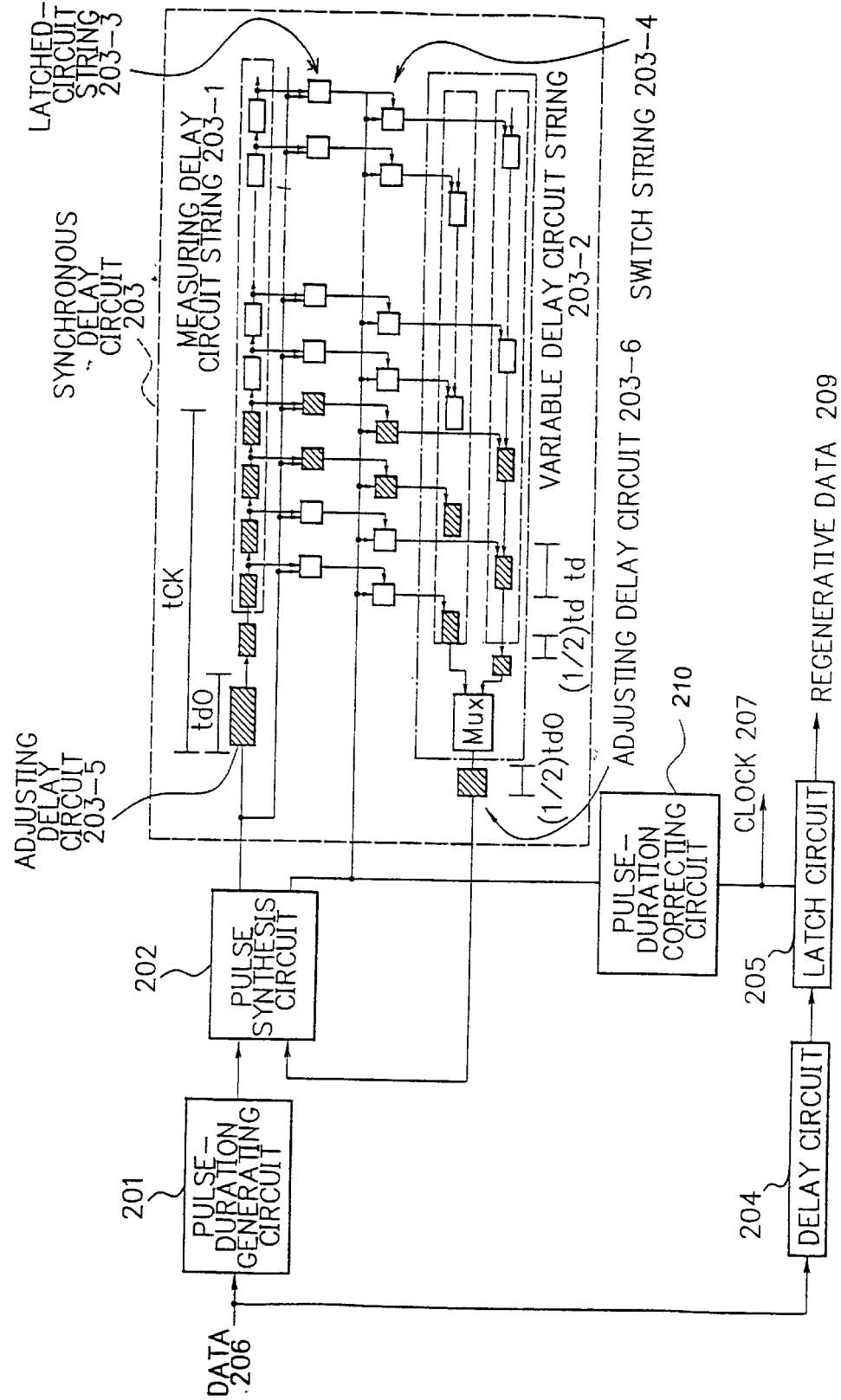
FIG. 9 is a circuit diagram showing a second embodiment of the present invention.

FIG. 9 is a circuit diagram showing a second embodiment of the present invention. The clock recovery circuit of the present embodiment has a pulse-duration generating circuit 201, a pulse synthesis circuit 202, a synchronous delay circuit 203, a delay circuit 204, a latched-circuit 205, and a pulse-duration correcting circuit 210. The clock recovery circuit generates clock 207 and regenerative data 209.

The synchronous delay circuit 203 includes a measuring delay circuit string 203-1, a variable delay circuit string 203-2, a latched-circuit string 203-3, a switch string 203-4, and adjusting delay circuits 203-5, and 203-6.

A main difference in between the second embodiment shown in FIG. 7 and the first embodiment shown in FIG. 4 is that, in the pulse-duration generating circuit 201, the pulse is regenerated from only the leading edge of the data 206, and the delay time formed at the synchronous delay circuit 203 comes into ½ of the minimum pitch of 2-pulse generated at the pulse-duration generating circuit 201.

Consequently, the pulse-duration generating circuit 201 causes the pulse to be regenerated from only the leading edge of the data 206, however, the delay time formed at the synchronous delay circuit 203 comes into ½ of 2-bits of the data namely, the width of 1-bit, so that the clock 207 with equivalent cycle to 1-bit of the data identical with the first embodiment is generated, and the regenerative data 209 is outputted.

In the second embodiment, since the clock is regenerated from only leading edge of the data, even though duty of the data shifts, there is an advantage that it is capable of obtaining cycle of 1-bit of the data.

As described above, according to the present invention, since the synchronous delay circuit causes the clock to be regenerated from either the minimum pulse of the data or the minimum pulse pitch, there is the advantage that the synchronous state is capable of being obtained by the minimum 1-data pulse.

While preferred embodiments of the invention have been described using specific term, such description is for illustrative purpose only, and it is to be understood that changes and variations may be made without departing from the spirit or scope of the following claims.

What is claimed is:

1. A clock recovery circuit comprising:
   a synchronous delay circuit which sets a delay time equivalent to a minimum data pitch of an input data, and which maintains said delay time;
   a pulse synthesis circuit which generates a clock from a data edge with a pulse from said synchronous delay circuit as an input; and
   a latched-circuit which latches data by using the clock from said pulse synthesis circuit, thus generating regenerative data.

2. A clock recovery circuit as claimed in claim 1, wherein said synchronous delay circuit sets a delay time equivalent to a minimum data pitch of data from both edges of said input data.

3. A clock recovery circuit as claimed in claim 1, wherein said synchronous delay circuit sets a delay time equivalent to a minimum data pitch of data from two successive input data.

4. A clock recovery circuit as claimed in claim 1, wherein a delay time set by said synchronous delay circuit. is equivalent to width of 1-bit of the data.

5. A data processing method of a clock recovery circuit which comprises a synchronous delay circuit, a pulse synthesis circuit, and a latched-circuit comprising the steps of:

setting a delay time equivalent to a minimum data pitch of an input data, and maintaining said delay time;

generating a clock from a data edge with a pulse from said synchronous delay circuit as an input; and latching data by using the clock from said pulse synthesis circuit, thus generating regenerative data.

* * * * *